March 20, 1962 W. M. HALLIDY 3,026,465
ALTERNATOR-RECTIFIER ELECTRICAL SYSTEM
Filed July 19, 1955 3 Sheets-Sheet 1
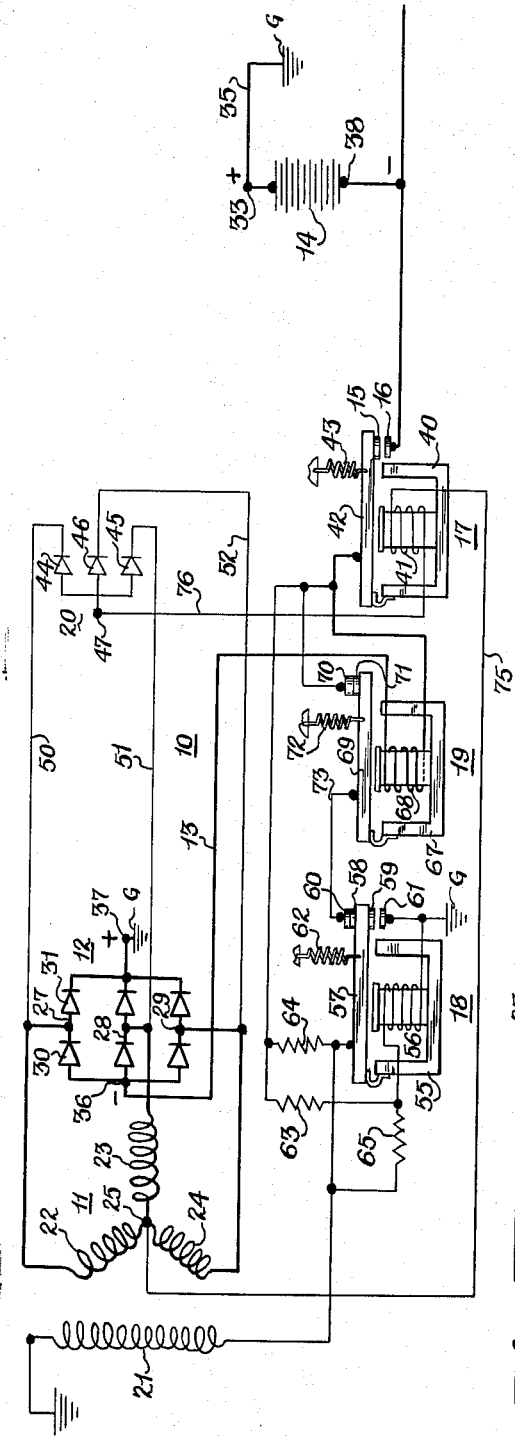
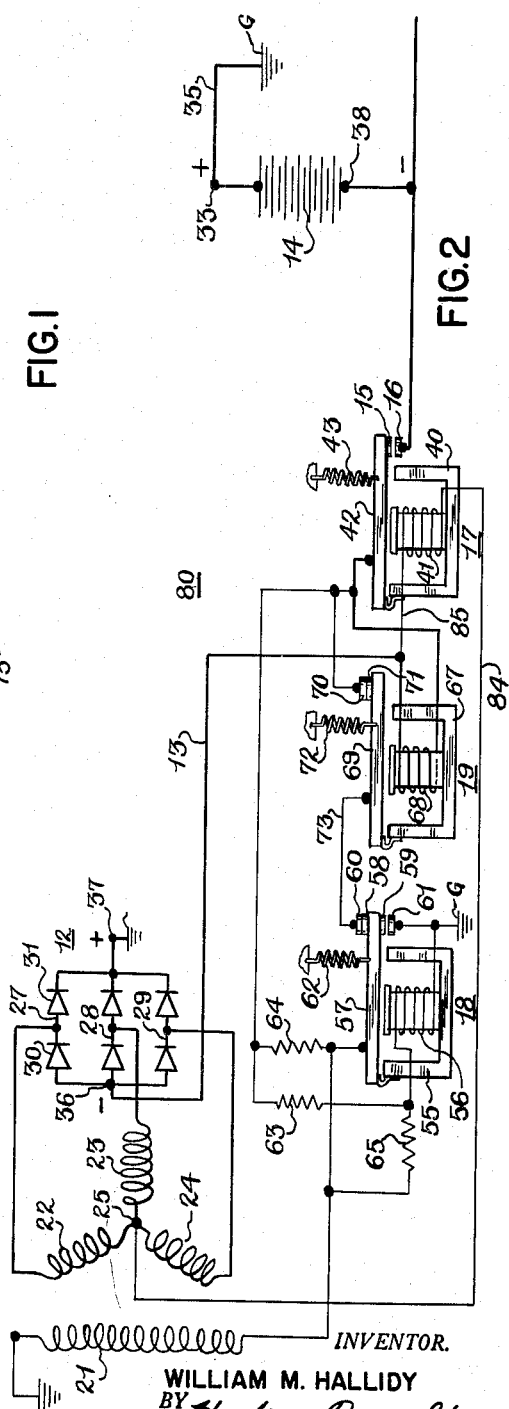
INVENTOR.
WILLIAM M. HALLIDY
ATTORNEYS March 20, 1962
W. M. HALLIDY
3,026,465
ALTERNATOR-RECTIFIER ELECTRICAL SYSTEM
Filed July 19, 1955
3 Sheets-Sheet 2
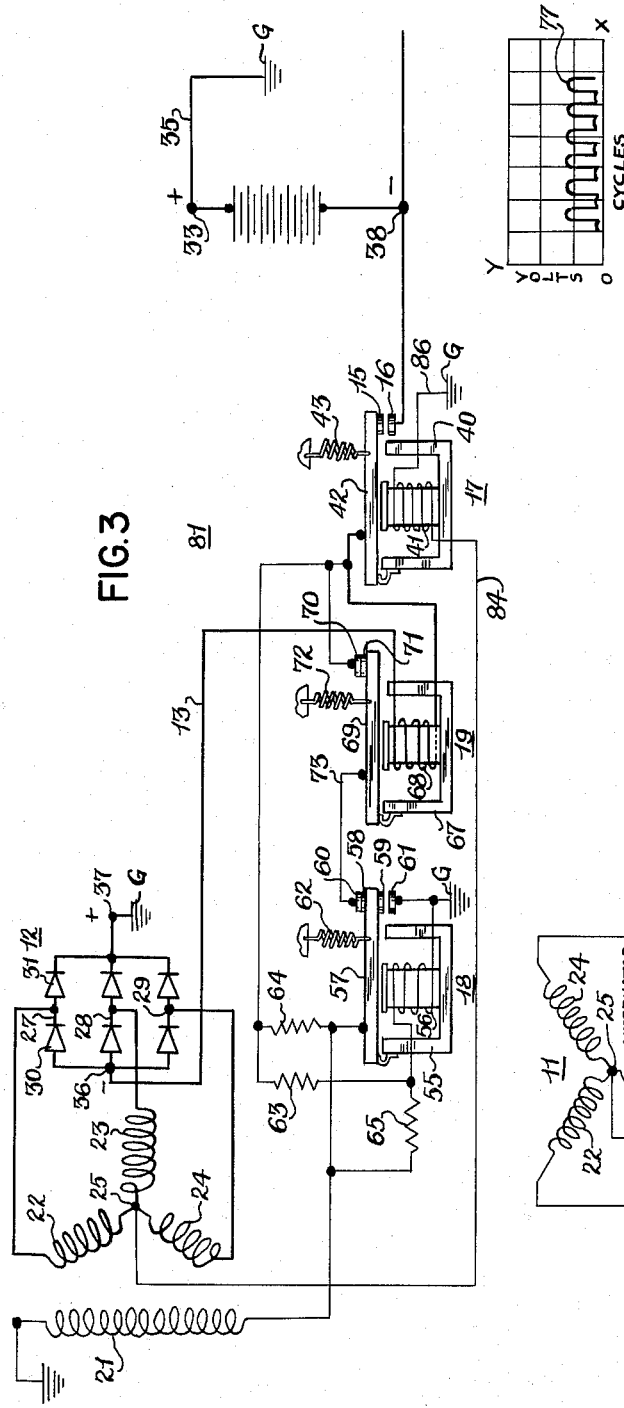
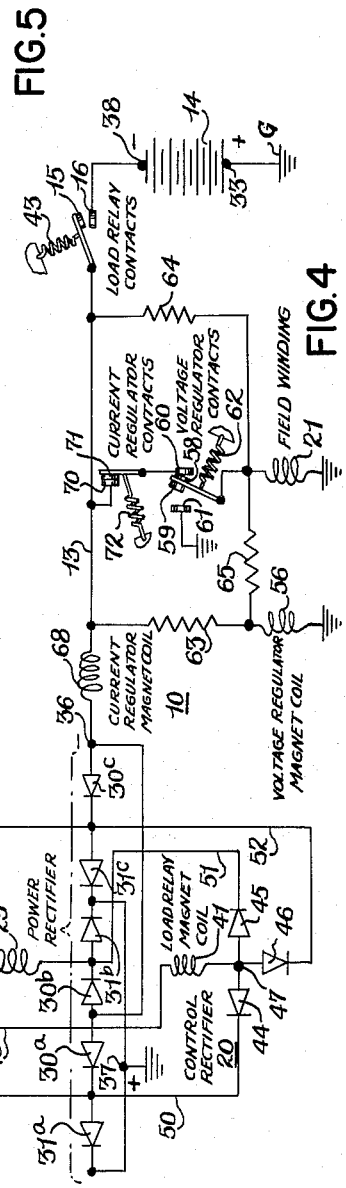
INVENTOR.
WILLIAM M. HALLIDY
BY Hudson, Boughton,
Williams, David & Hoffmann
ATTORNEYS March 20, 1962 W. M. HALLIDY 3,026,465
ALTERNATOR-RECTIFIER ELECTRICAL SYSTEM
Filed July 19, 1955 3 Sheets-Sheet 3
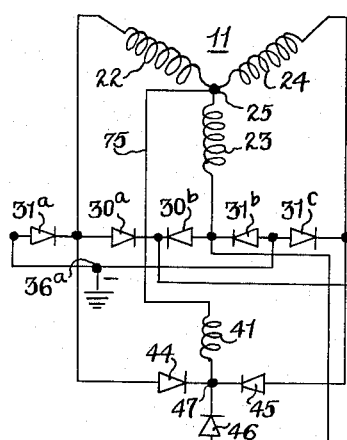
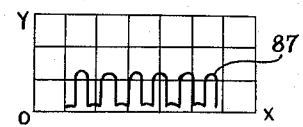
FIG.8
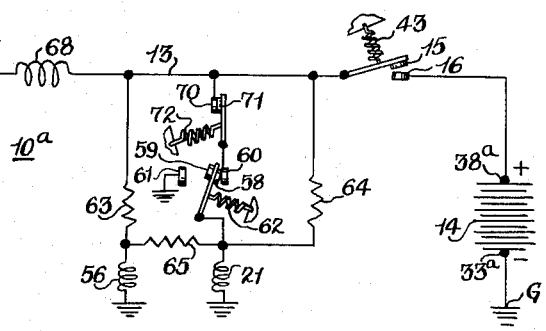
FIG.6
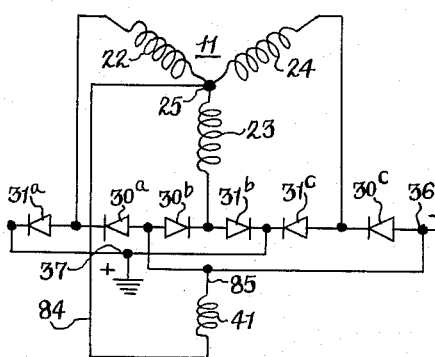
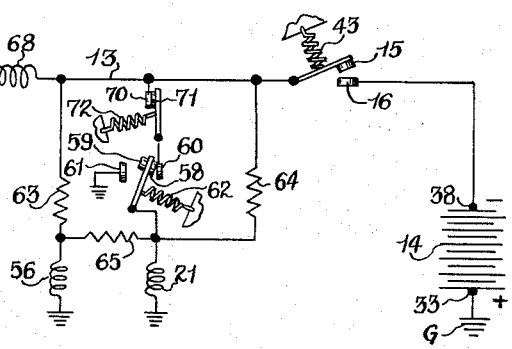
FIG.7
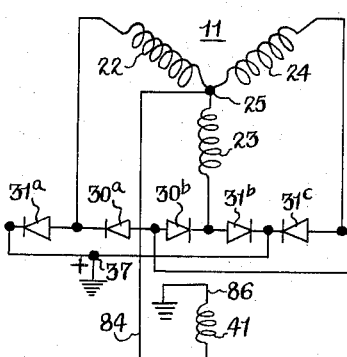
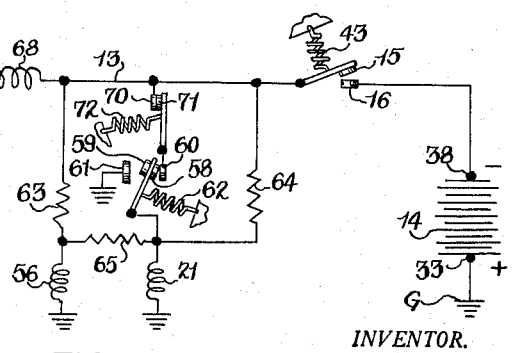
FIG.9
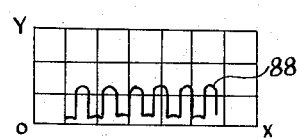
FIG.10
INVENTOR.
WILLIAM M. HALLIDY
BY Hudson, Boughton,
Williams, David & Hoffmann
ATTORNEYS

United States Patent Office 3,026,465
Patented Mar. 20, 1962

3,026,465
ALTERNATOR-RECTIFIER ELECTRICAL SYSTEM
William M. Hallidy, Lakewood, Ohio, assignor to The Leece-Neville Company, Cleveland, Ohio, a corporation of Ohio
Filed July 19, 1955, Ser. No. 522,921
14 Claims. (Cl. 320—28)

This invention relates to generating systems of the alternator-rectifier type, and more particularly, to the control of the load relay employed in such a system for connecting a three-phase alternator with the external load. This application is related as to subject matter to application Serial No. 506,572, filed May 6, 1955, now Patent 2,789,265 granted April 16, 1957.

In generating systems of the alternator-rectifier type, which include a storage battery to be charged as a portion of an external load connected with a three-phase alternator, the load circuit is usually connected with the direct current terminals of the power rectifier through a load relay. In such a system, it is desirable that the load relay be under the control of the alternator so that the relay will close and open automatically in response to a predetermined terminal voltage output value of the alternator.

The most economical way of automatically closing the load relay in response to the operation of the alternator, would be to energize the load relay magnet coil by a portion of the direct current output of the power rectifier, but when the load relay coil is energized in this way, the opening of the load relay is no longer under the control of the alternator. This results from the fact that as soon as the relay contacts are closed by the alternator output voltage, its magnet coil will then be subject to energization from the battery and will hold the contacts closed after the alternator output voltage drops to zero value.

To accomplish the desired automatic control of the load relay by the alternator, it has heretofore been necessary to provide the system with an auxiliary or control rectifier as is shown in United States Patent No. 2,646,543, granted July 21, 1953, for connecting the load relay magnet coil with the alternator. Such a control rectifier has added considerably to the cost of generating systems of this kind.

As its principal object, the present invention therefore provides a novel generating system of the alternator-rectifier type in which the above-explained cost disadvantage is overcome, and in which the closing and opening of the load relay is automatically responsive to the operation of a three-phase alternator having Y-connected inductor or phase windings, by the load relay magnet coil being connected with the neutral point of the phase windings.

Another object is to provide a novel alternator-rectifier generating system in which the load relay magnet coil is energized through the neutral point of the three-phase alternator while a portion of the power rectifier is utilized as a blocking means to prevent energization of the relay magnet coil from the storage battery of the external load circuit.

Still another object is to provide such a generating system in which the energization of the load relay magnet coil from the neutral point of the three-phase alternator takes place through one portion of the power rectifier, which is preferably a multiple-cell full-wave rectifier, while another portion of the power rectifier prevents energization of the relay magnet coil from the battery of the load circuit.

This invention also contemplates, as a further object thereof, a generating system of the alternator-rectifier type which includes an auxiliary or control rectifier in the energizing circuit for the load relay magnet coil, but in which the coil energizing circuit is connected with the neutral point of the alternator, such that the control rectifier can be of a relative simple and inexpensive character.

Additionally, this invention provides such an alternator-rectifier generating system in which the magnet coil of the load relay has one end thereof connected with the neutral point of the Y-connected phase windings of the alternator and has its other end connected with one of the direct current load terminals of the power rectifier, and in which the connection for such other end of the magnet coil can be either a grounded or ungrounded connection.

Other objects and advantages of this invention will be apparent in the following detailed specification and in the accompanying sheets of drawings forming a part thereof and in which:

FIG. 1 is a wiring diagram illustrating an electrical generating system embodying the present invention;

FIG. 2 is a wiring diagram illustrating a generating system similar to that of FIG. 1, but employing a different circuit for the load relay magnet coil and in which the control rectifier has been eliminated;

FIG. 3 is a wiring diagram illustrating a generating system similar to that of FIG. 2 but which employs a still different load relay control circuit;

FIG. 4 is a schematic wiring diagram of the generating system of FIG. 1;

FIG. 5 is a graph illustrating the wave form obtained in the generating system of FIG. 1 for the energizing current supplied to the load relay magnet coil;

FIG. 6 is a schematic wiring diagram illustrating the same generating system as FIG. 4 but as a negative-ground form of the system;

FIGS. 7 and 9 are schematic wiring diagrams for the generating systems of FIGS. 2 and 3 respectively; and FIGS. 8 and 10 are graphs illustrating the wave form for the relay magnet coil current in the generating systems of FIGS. 2 and 3 respectively.

As one practical embodiment of the invention, FIG. 1 illustrates a generating system 10 having an alternator 11 connected with an external direct current load through a main or power rectifier 12, and through a load conductor 13 and a common ground G. The external load includes a storage battery 14 which is connected with the power rectifier 12 by the conductor 13 through the series contacts 15 and 16 of a load relay 17. Other components of the generating system 10 include voltage and current regulators 18 and 19 of the relay type for controlling the operation of the alternator 11, and a control rectifier 20 serving the load relay 17. These various components of the generating system 10 and their functioning therein will be further described hereinafter.

The alternator 11 is a three-phase alternator having a field winding 21 and inductor or phase windings 22, 23 and 24. For the purposes of this invention, the inductor windings are Y-connected and have a neutral point 25.

The power rectifier is a three-phase full-wave multiple-cell rectifier of the dry-plate type and is here shown as having three parallel circuit arms 27, 28 and 29 with which the inductor windings 22, 23 and 24 of the alternator 11 are connected, respectively. Each of the circuit arms 27, 28 and 29 has a pair of rectifier cells 30 and 31 therein and the connection of each inductor winding of the alternator with its associated circuit arm of the rectifier is made at a point between such pair of rectifier cells.

The generating system 10 is here shown as being a system of the so-called positive-ground type in which the positive terminal 33 of the storage battery 14 is connected to the common ground G by the conductor 35. The power rectifier 12 further includes direct current load terminals 36 and 37 of which the terminal 37 is a positive terminal and is connected to the common ground.

The negative direct current terminal 36 of the power rectifier 12 is connected with the negative terminal 38 of the battery 14 through the load conductor 13.

The load relay 17 is a conventional load relay comprising a magnet frame 40 having an energizing coil 41 thereon, and an armature 42 carrying the movable switch contact 15 and responsive to the energization of the magnet coil 41. The load relay contacts 15 and 16 are normally open for disconnecting the battery 14 from the alternator 11 and such open condition of these contacts is normally maintained by the tension spring 43. The energization of the load relay magnet coil 41, as provided by this invention, will be explained hereinafter.

The control recifier 20 is here shown as being a three-cell rectifier consisting of three rectifier cells 44, 45 and 46 which are also of the above-mentioned dry-plate type. The three cells 44, 45 and 46 of the control rectifier 20 are connected on one side thereof with the inductor windings 22, 23 and 24 of the alternator 11 by the conductors 50, 51 and 52, respectively. The three control rectifier cells 44, 45 and 46 are connected on the other side thereof with a common direct current terminal 47 which can also be referred to as a control current terminal.

The voltage regulator 18 can be of a conventional form and is here shown as being of the kind disclosed in and covered by United States Patent 2,520,689, granted August 29, 1950. The voltage regulator 18 comprises a frame 55 having a voltage magnet coil 56 thereon, and a vibratory armature 57 carrying movable switch contacts 58 and 59 which cooperate, respectively, with upper and lower stationary contacts 60 and 61. A tension spring 62 effective on the armature 57 urges the same toward a normally closed condition for the cooperating contacts 58 and 60.

The voltage regulator 18 also comprises a ballast resistor 63 in series circuit with the magnet coil 56, a point resistor 64 in shunt relation to the upper pair of cooperating contacts 58 and 60, and a secondary resistor 65 which assists the ballast resistor 63 in controlling the energization of the magnet coil 56.

The current regulator 19 can also be a conventional form of such a device and is here shown as comprising a magnet frame 67 having a series magnet coil 68 thereon, and a vibratory armature 69 carrying a movable switch contact 71 which is urged toward a normally closed engagement with a stationary contact 70 by the action of a tension spring 72 on the armature.

The point resistor 64 of the voltage regulator 18 also serves as a point resistor in shunt relation to the cooperating contacts 70 and 71 of the current regulator 19. The point resistor 64 and the voltage and current regulator contacts 58, 60 and 70, 71 are in the field circuit of the alternator 11 and control the energization of the field winding 21 in accordance with the terminal voltage and current output values of the alternator, as is understood by those skilled in this art.

The lower stationary voltage regulator contact 61 is connected with the common ground G and the upper stationary voltage regulator contact 60 is connected with the movable current regulator contact 71 by the conductor 73. Although the functioning of the voltage and current regulators 18 and 19 in controlling the operation of the alternator 11 is generally understood by those skilled in this art and need not be here described in detail, it can be mentioned, however, that whenever the contacts 58 and 60 of the voltage regulator and the contacts 70 and 71 of the current regulator 19 are in a closed condition at the same time, the point resistor 64 is short-circuited out of the energizing circuit of the field winding 21. Whenever the voltage regulator contacts 58 and 60 or the current regulator contacts 70 and 71 are open, the point resistor 64 is in series circuit with the field winding 21. Likewise, it can be mentioned that whenever the lower voltage regulator contacts 59 and 61 are closed, the field winding 21 is substantially short-circuited for collapsing the field excitation.

In accordance with the present invention, the load relay magnet coil 41 is energized from the alternator 11 through the control rectifier 20 and the neutral point 25 of the Y-connected phase windings 22, 23 and 24 of the alternator. One end of the load relay magnet coil 41 is electrically connected directly with the neutral point 25 by the conductor 75, and the other end of the magnet coil is connected with the common direct current terminal 47 of the control rectifier 20 by the conductor 76.

From the construction and functioning of the components of the generating system 10 as thus far described, it will be seen that when the alternator 11 is not being driven, the load relay contacts 15 and 16 will be held open by the spring 43 to thereby disconnect the battery 14 from the alternator. When the alternator is placed in operation as by the starting of the vehicle driving engine, the load relay magnet coil 41 will be energized by the alternator through the neutral point 25 and through the control rectifier 20 to thereby automatically close the load relay contacts 15 and 16 and connect the external load in circuit with the alternator through the power rectifier 12.

To explain further how the load relay magnet coil 41 is suitably energized from the alternator through the three-cell control rectifier 20 and the neutral point 25, it is pointed out that when the alternator is placed in operation, current flows from the neutral point to the load relay coil through the conductor 75 and then from the magnet coil to the common direct current terminal 47 of the control rectifier through the conductor 76. From the common direct current terminal 47, the current flows back to the phase windings of the alternator through the cells 44, 45 and 46 of the control rectifier 20 and the conductors 50, 51 and 52.

From the energizing circuit as just above traced for the load relay magnet coil 41, it will be seen that none of the cells of the power rectifier 12 are included in this circuit. It will be seen, however, from the wiring diagrams of FIGS. 1 and 4, that the power rectifier 12 functions in cooperation with this relay magnet coil circuit, in that it prevents energization of the magnet coil from the storage battery 14 when the load relay contacts 15 and 16 have been closed in response to operation of the alternator. Thus, the cells 30$^a$, 30$^b$ and 30$^c$ will act as blocking cells and will prevent energization of the load relay magnet coil from the negative terminal of the battery 14, and the rectifier cells 31$^a$, 31$^b$ and 31$^c$ will act as blocking cells for preventing energization of the load relay magnet coil from the positive terminal of the storage battery.

From the energizing circuit above described for the magnet coil 41 of the load relay 17, it will now also be seen that by the use of the relatively simple and inexpensive three-cell control rectifier 20 in conjunction with the circuit connection to the neutral point 25, satisfactory energization of the load relay under the control of the alternator 11 is obtained. This satisfactory energization of the load relay magnet coil from the alternator 11 with relatively reduced rectifier cost is further illustrated by the graph of FIG. 5 in which the wave form curve 77 illustrates the voltage characteristic of this energizing current. The curve 77 represents two cycles of operation of the alternator 11 and was plotted relative to the zero value horizontal axis OX in accordance with voltage values shown by an oscilloscope to exist in the load relay magnet coil circuit during the functioning of the generating system 10.

As has been indicated above, the wiring diagram of FIG. 4 is a schematic wiring diagram showing the same alternator-rectifier generating system as is shown in FIG. 1, and hence, the same reference characters have been used in FIG. 4 to designate the same corresponding parts. From this schematic diagram, it can be seen that the energizing circuit for the load relay magnet coil 41 includes the three rectifier cells 44, 45 and 46 of the control rectifier 20 and the connection to the neutral point 25 of the alternator. This schematic wiring diagram again illustrates the fact that none of the rectifier cells of the power rectifier 12 are contained in the energizing circuit for the magnet coil 41 but cells 30 do serve as blocking cells for preventing energization of this magnet coil from the battery 14 when the load relay contacts 15 and 16 are closed.

The schematic wiring diagram of FIG. 6 shows an alternator-rectifier generating system 10ª which is substantially the same in structure and function as the above-described generating system 10 but which is a negative ground type of system. In this negative-ground system 10ª, the negative and positive direct current terminals of the power rectifier are designated 36ª and 37ª, and the negative and positive terminals of the battery 14 are designated 33ª and 38ª.

In the system 10ª, all of the rectifier cells of the power rectifier 12 are shown in a position reversed from FIG. 4 inasmuch as this system is of the negative-ground type. The wave form of the energizing current of the load relay magnet coil 41 in the negative-ground system of FIG. 6 is the same as is represented by the curve 77 of the graph shown in FIG. 5.

FIGS. 2 and 3 of the drawings show alternator-rectifier generating systems 80 and 81 which are similar to the generating systems 10 and 10ª in that the energizing circuit for the magnet coil 41 of the load relay 17 is connected with the alternator 11 through the neutral point 25 of the phase windings. The generating systems 80 and 81 differ from the systems 10 and 10ª, however, in that the control rectifier has been eliminated entirely. FIGS. 7 and 9 of the drawings are schematic wiring diagrams of the modified generating systems 80 and 81.

From FIGS. 2 and 7 it will be seen that in the generating system 80, one end of the energizing circuit for the load relay magnet coil 41 is directly connected with the neutral point 25 by the conductor 84. The other end of this energizing circuit is connected with the alternator through a portion of the load conductor 13 and through the conductor 85. Similarly in the generating system 81 of FIGS. 3 and 9, one end of the energizing circuit for the load relay magnet coil 41 is connected directly with the neutral point 25 by the conductor 84. The other end of this energizing circuit is connected with the common ground G by the conductor 86.

In the generating system 80 of FIGS. 2 and 7, it will also be seen that portions of the power rectifier 12 are included in the energizing circuit for the load relay magnet coil 41, in that the cells 30ª, 30ᵇ and 30ᶜ are in series circuit with the phase windings and the load relay magnet coil. Energization of the load relay coil from the battery 14 is prevented when the load relay contacts 15 and 16 have been closed, by the cells 31ª, 31ᵇ and 31ᶜ of the power rectifier 12 which then act as blocking cells.

Similarly in the generating system 81 of FIGS. 3 and 9, the cells 31ª, 31ᵇ and 31ᶜ of the power rectifier 12 are included in the energizing circuit for the load relay magnet coil 41 and are in a series relation with the phase windings of the alternator and the magnet coil. The cells 30ª, 30ᵇ and 30ᶜ of the power rectifier act as blocking cells to prevent energization of the load relay magnet coil from the battery 14 when the contacts 15 and 16 of the load relay have been closed.

FIGS. 8 and 10 are graphs in which the curves 87 and 88 represent the wave form of the energizing current obtained in the load relay coil 41 in the generating systems 80 and 81, respectively. The curves 87 and 88 are substantially the same as the curve 77 of FIG. 5 and indicate that substantially the same current and voltage values are obtained in the load relay magnet coil circuit during the functioning of the generating systems 80 and 81 as are obtained during the functioning of the generating systems 10 and 10ª.

From the accompanying drawings and the foregoing detailed description, it will now be readily understood that this invention provides an alternator-rectifier generating system of a kind suitable for use on a vehicle and in which energization of the load relay magnet coil is obtained from the alternator, such that the load relay is under the control of the alternator and such that this desired result is obtained in a very practical and inexpensive manner by connection of the load relay magnet coil circuit with the alternator through the neutral point of the phase windings thereof. It will now also be understood that, in accordance with the teaching of this invention, a control rectifier can be used in the load relay coil energizing circuit but, under the present invention, such control rectifier can be of a simplified and inexpensive form as compared with the control rectifiers heretofore used for this purpose in alternator-rectifier generating systems.

Although the generating systems of the present invention have been illustrated and described herein to a somewhat detailed extent, it will be understood, of course, that the invention is not to be regarded as being limited correspondingly in scope, but includes all changes and modifications coming within the terms of the claims hereof.

Having thus described my invention, I claim:

1. In an alternator-rectifier generating system, a three-phase alternator having Y-connected inductor phase windings, a power rectifier, an external direct-current load circuit connected with said alternator through said power rectifier, a load relay comprising a magnet coil and normally open switch contacts controlling said load circuit and adapted to be closed in response to energization of said magnet coil, and an energizing circuit connecting said magnet coil directly with said alternator through the neutral point of said Y-connected phase windings.

2. In an alternator-rectifier generating system, a three-phase alternator having Y-connected inductor phase windings, a power rectifier having direct-current load terminals, an external direct-current load circuit connected with said alternator through said rectifier, a load relay comprising a magnet coil and normally open switch contacts controlling said load circuit and adapted to be closed in response to energization of said magnet coil, and circuit means connecting said magnet coil in circuit with said alternator through said phase windings and portions of said rectifier in series relation and wherein the ends of said magnet coil are connected respectively with one of said load terminals and the neutral point of said Y-connected phase windings.

3. In an alternator-rectifier generating system, a three-phase alternator having Y-connected inductor phase windings, a power rectifier having direct-current load terminals, an external direct-current load circuit connected with said alternator through said rectifier and including a storage battery, a load relay comprising a magnet coil and normally open switch contacts controlling said load circuit and adapted to be closed in response to energization of said magnet coil, and circuit connections directly connecting said magnet coil in series circuit with said alternator through the neutral point of said Y-connected phase windings, portions of said power rectifier being effective to prevent energization of said magnet coil from said battery through said switch contacts when the latter have been closed in response to operation of the alternator.

4. In an alternator-rectifier generating system, a three-phase alternator having Y-connected inductor phase windings, a power rectifier having direct-current load terminals, an external direct-current load circuit connected with the load terminals of said power rectifier, and a load relay comprising a magnet coil and normally open switch contacts controlling said load circuit and adapted to be closed in response to energization of said magnet coil, said magnet coil having one end thereof electrically connected directly with one of said load terminals and its other end electrically connected directly with the neutral point of said Y-connected phase windings.

5. In an alternator-rectifier generating system, a three-phase alternator having Y-connected inductor phase windings, a power rectifier, an external direct-current load circuit connected with said alternator through said power rectifier, a control rectifier consisting of three rectifier cells having a common terminal on one side thereof and on the other side thereof having individual terminals connected with the respective phase windings of said alternator, a load relay comprising a magnet coil and normally open switch contacts controlling said load circuit and adapted to be closed in response to energization of said magnet coil, and an energizing circuit connecting said magnet coil with said alternator and wherein one end of said magnet coil is connected with said common terminal of said control rectifier and the other end is connected with the neutral point of said Y-connected phase windings.

6. In an alternator-rectifier generating system, a three-phase alternator having Y-connected inductor phase windings, a full-wave power rectifier having direct-current load terminals and comprising connected circuit arms containing rectifier cells, an external direct-current load circuit connected with said alternator through said power rectifier, a load relay comprising a magnet coil and normally open switch contacts controlling said load circuit and adapted to be closed in response to energization of said magnet coil, a control rectifier having a direct-current control circuit terminal and comprising rectifier cells connected in parallel between said control circuit terminal and the outer ends of phase windings of said alternator, and a circuit for energizing said magnet coil from said alternator and electrically connecting said magnet coil in series relation between said control circuit terminal and the neutral point of said Y-connected phase windings.

7. In an alternator-rectifier generating system, a three-phase alternator having Y-connected inductor phase windings, a full-wave power rectifier having direct-current load terminals, an external direct-current load circuit connected with said load terminals and including a storage battery to be charged, said power rectifier having three circuit arms each containing a pair of rectifier cells and the outer ends of said phase windings being connected with said circuit arms at connection points located between said pairs of cells, a load relay comprising a magnet coil and normally open switch contacts located in and controlling said load circuit and adapted to be closed in response to energization of said magnet coil, and circuit means connecting one end of said magnet coil with one of said load terminals and the other end with the neutral point of said Y-connected phase windings, portions of said power rectifier being effective to prevent energization of said magnet coil from said battery through said switch contacts when the latter have been closed in response to operation of the alternator.

8. In an alternator-rectifier generating system, a three-phase alternator having Y-connected inductor phase windings, a full-wave power rectifier having direct-current load terminals, an external direct-current load circuit connected with said load terminals and including a storage battery to be charged, said power rectifier having three circuit arms each containing a pair of rectifier cells and the outer ends of said phase windings being connected with said circuit arms at connection points located between said pairs of cells, a load relay comprising a magnet coil and normally open switch contacts located in and controlling said load circuit and adapted to be closed in response to energization of said magnet coil, a control rectifier having a direct-current control circuit terminal and comprising three rectifier cells connected between said control circuit terminal and the outer ends of the respective phase windings of said alternator, and circuit means connecting said magnet coil between said control circuit terminal and directly to the neutral point of said Y-connected phase windings, portions of said power rectifier being effective to prevent energization of said magnet coil from said battery through said switch contacts when the latter have been closed in response to operation of the alternator.

9. In a storage battery charging circuit, the combination comprising; a storage battery, an alternating current generator having a three-phase Y-connected output winding having a neutral connection, a rectifier in circuit between the generator and battery for changing the alternating current output of said generator to direct current for charging said battery, and a switch means including a relay having an actuating coil directly connected to the neutral connection of the windings of said generator and with the battery side of said rectifier circuit.

10. In a storage battery charging circuit, the combination comprising; a storage battery, an alternator having at least three stator coil windings connected to a common junction to form a three-phase Y-connected stator winding, a three-phase full-wave bridge rectifier in circuit between said alternator and battery for changing the A.C. output of said alternator to D.C. for charging said battery, and a means for closing the circuit between said rectifier and battery including a relay having a single actuating coil connected in circuit with the common junction of said stator windings and the battery side of said rectifier circuit.

11. In a storage battery charging circuit for use on a motor vehicle having a variable speed prime mover, an alternator operatively connected with the prime mover of the vehicle to be driven at variable speeds, said alternator having stator windings connected to a common junction to form a Y-connected stator winding, a storage battery having a load circuit, a rectifier connected in circuit with said stator windings and said battery adapted to change the A.C. output of said alternator to D.C. current when the alternator potential exceeds the battery potential and a means in the rectifier circuit between said rectifier and battery including a coil winding connected with the common junction of said stator windings for closing the rectifier circuit between said rectifier and battery when the alternator potential exceeds the battery potential.

12. In a storage battery charging circuit for use on a motor vehicle having a variable speed prime mover, an alternator connected to be driven by said prime mover having three output terminals and three coils each having one end connected to one of the output terminals and the other end connected to a common junction, a storage battery, a rectifier having input terminals connected to the terminals of the alternator and output terminals, circuit means connecting the output terminals of said rectifier with said battery, and a relay having a pair of switch contacts in the circuit between said rectifier and battery, an actuating coil for said relay connected between said common junction and one of the output terminals of said rectifier for closing said switch contacts when the potential between the junction and terminal exceeds a predetermined value.

13. In a battery charging system, an alternator having three-phase windings Y-connected to a common neutral and having output terminals, a three-phase full-wave bridge rectifier connected with said output terminals and having first and second D.C. output terminals, a circuit connecting said rectifier first output terminal with the battery for supplying rectified current from said alternator to said battery, a relay in said circuit having a coil winding and an armature responsive to the attractive force of said coil winding for closing said circuit when said coil winding is energized, and means connecting said coil winding between the neutral of the Y-connected windings of said alternator and said first output terminal.

14. In a storage battery charging circuit for use on a motor vehicle having a variable speed prime mover, an alternator operatively connected with the prime mover of the vehicle to be driven at variable speeds, said alternator having stator windings connected to a common junction to form a three-phase Y-connected stator winding, a storage battery, a three-phase full-wave bridge rectifier having a pair of output terminals connected in circuit with said stator windings and said battery and adapted to change the A.C. output of said alternator to D.C. current when the alternator potential exceeds the battery potential, and a means including a single coil winding connected between the common junction of said stator windings and an output terminal of said bridge rectifier for closing the rectifier circuit between said rectifier and battery when the potential at the output terminals of said rectifier exceeds the battery potential.

References Cited in the file of this patent

UNITED STATES PATENTS

| | | |
|---|---|---|
| 1,741,691 | Fenton | Dec. 31, 1929 |
| 2,258,248 | Hunter | Oct. 7, 1941 |
| 2,303,445 | Evans et al. | Dec. 1, 1942 |
| 2,320,123 | Farnham | May 25, 1943 |
| 2,520,689 | Niemi | Aug. 29, 1950 |
| 2,646,543 | Gilchrist | July 21, 1953 |
| 2,651,749 | Weber | Sept. 8, 1953 |
| 2,740,084 | Haas | Mar. 27, 1956 |

FOREIGN PATENTS

| | | |
|---|---|---|
| 608,856 | Great Britain | Sept. 22, 1948 |
| 110,548 | Australia | May 7, 1940 |